United States Patent Office 3,484,789
Patented Dec. 16, 1969

3,484,789
MULTIPLEX RECORDER
Hans-Otto Kleiner, Egelsbach, Wilhelm Ruland, Frankfurt am Main, Klaus Paikert, Bad Homburg, Rudolf Höhl and Günter Seiler, Frankfurt am Main, Hellmut Schneider, Buchschlag, and Detlef Werner, Frankfurt am Main, Germany, assignors to Hartmann & Braun Aktiengesellschaft, a corporation of Germany
Filed May 2, 1968, Ser. No. 726,032
Claims priority, application Germany, May 11, 1967, H 62,712
Int. Cl. G01d 9/04
U.S. Cl. 346—34        12 Claims

ABSTRACT OF THE DISCLOSURE

A multiplex recorder operating on the balancing voltage principle and having a rear fixed housing portion containing station selector and range changing switch means and an outwardly swingable front part containing the registration system. The switches feature multi-contact blades of generally comb-shape actuated by rolls provided with camming lugs helically spaced for the station selector and adjustably positionable for range. A mechanical transmission means from the rear portion to the front part for the printing system to enable the system to run uninterrupted while the front is swung out. The electrical connection of the various elements are greatly simplified by alinement of rows of blade assemblies with blade extensions adjacent external terminal connectors.

BACKGROUND OF THE INVENTION

Field of the invention

Multiplex recorder with station selector and range switches in a fixed housing portion and registering means in a front portion outwardly swingable.

Description of the prior art

Multiplex point-by-point recorders are known in which registering apparatus including chart paper feed, the measuring system which pickup signals to be translated for point-by-point print-out is located in a swing-out corresponding portion of a housing. Such known instruments can exhibit readings from large number of selected control point stations as discontinuous lines of different color and some can be modified to operate over selected ranges.

Motorized devices for the recording equipment are also housed in the portion of the recorder that can be swung out, as is the chart strip which was taken from a supply roll by means of transport rollers run by a motor or clockwork to a printing location and after the printing wound up on a take-up roll. The measuring system is an electrical device wherein a servo motor is used which substantially so adjusts a tapped potentiometer fed by an auxiliary voltage that the tapped voltage balances the voltage being measured. Coupled to the slide tap of the potentiometer is a variable printing head so coupled by a lever drive on a guide bar transverse over the recording chart. The position of the printing head represents the instantaneous values. In order to identify the different sensor stations the printing head is outfitted with corresponding printing types which are inked by rollers. Each station is assigned a predetermined color or printing character. The circuit number of the cut-in stations is legible on the printing head and is, if necessary, struck from time to time near the associated recording tracing. The changeover of the printing head or the color as well as the printing movement of the head is accomplished by a switching gear which is driven by an additional electric motor and it likewise drives the electromechanical station selector switch which is also in the outer swingable registering part.

In the fixed-position recorder housings i.e. without swingable fronts containing portions of apparatus, there are, essentially, the necessary constant voltage means for the compensation of the voltage being measured and the requisite amplifier for the control of the servo motor and means for phase control of the latter. The terminal connector lugs for the operation voltage and the leads to the respective sensing stations are normally provided on the rear wall of the housing.

In these known constructions of a multiplex printing recorder there is a voluminous amount of wiring and an exceedingly great attendant effect in construction time and cost. This is in large measure due to the large number of wires and connections from the registering portion having drive and switch means to the electrical equipment in the fixed housing, which means are generally connected fast to cabling. Mainly these are station circuit leads which lead from the external terminal connectors to the measuring current switches. Furthermore a great many connectors are run in the recording portion to connect the station circuit switches and the other electrical equipment. Fixed position housings must result in the connection of the station circuit lines to the numerous external terminal connectors.

Another form of multiplex point recorder having a stylus bearing portion to swing outwardly is known. In this instrument the function of the station selector switch is taken over by a corresponding number of relays which are arranged in the housing as well as in the recording portion. But here the electromechanical switching device for operating these relays runs synchronously with the point printer in the swingable part of the recorder and there must be numerous conductor wires between the back housing and the front part of the recorder and the wires are grouped together in several cables.

SUMMARY OF THE INVENTION

The present invention is characterized by the electrical wiring being especially simple and easily accomplished. The measuring ranges can be associated with the several sensing stations at will without alteration of wiring or disturbing the measuring circuit. The electromechanical switching device for measuring circuit selections including the sensing station selector switch, and if necessary the range changing switch, are mounted on the fixed part of the instrument housing and between the latter and changeover device for the printer there is a gearing connection that allows relative swinging movement between the two portions. By this construction the many station or sensing lead wires of the known construction is reduced to no more than three to connect directly to the balancing circuit in the registering part.

The relocation of the station and range selector switches from the swingable front part of the instrument to the rear stationary housing, is accomplished by drive gear connection hinging the two parts together and is an advantage not heretofore produced in a point printer recorder.

Moreover there is provided an easily made compact switch having robust contacts which minimize trouble and signal noise.

Having the station circuit selector switch in the fixed portion of the housing enables a further simplification of the wiring and its installation by having the switch made up of adjacent conduct blade assemblies alongside one another positioned with respect to the exterior terminal connector clamps so that the assemblies are connectable to the latter in straight lines without crossing other conductors to the clamps. In this respect there is an especially favorable situation in the wiring when the contact spring assemblies of the station selector switch are located near one another on the same side of the housing and at the same distances apart as the exterior terminal clamps of the instrument.

The station selector switch and range switch contact springs to be connected in their respective assemblies are in the form of a comb having adjacent parallel teeth providing the separate blades. This simplifies wiring since instead of a lead connector to each blade a single connection to the comb back is enough.

The contact blade assemblies of the range switch are operated by a roll having adjustably positioned cam lugs so that for each switch position a lug on the roll will engage it and these lugs can be set at predetermined positions especially in the longitudinal grooves along the length of the roll.

Another measure for saving work and material in the method of connecting up the elements of the instrument is in having the range changing switch carry side-by-side contact strips parallel and in the immediate vicinity of the blade assemblies. Range-changing circuitry takes the form of printed circuit sheets and its connection to the appropriate blade of the switch assemblies is by pin plug connection with wires thereon.

A recorder printer according to the invention can be set up for twelve sensing stations and have six different measuring ranges as shown in the drawing.

DESRIPTION OF THE PREFERRED EMBODIMENT

Figure 1:
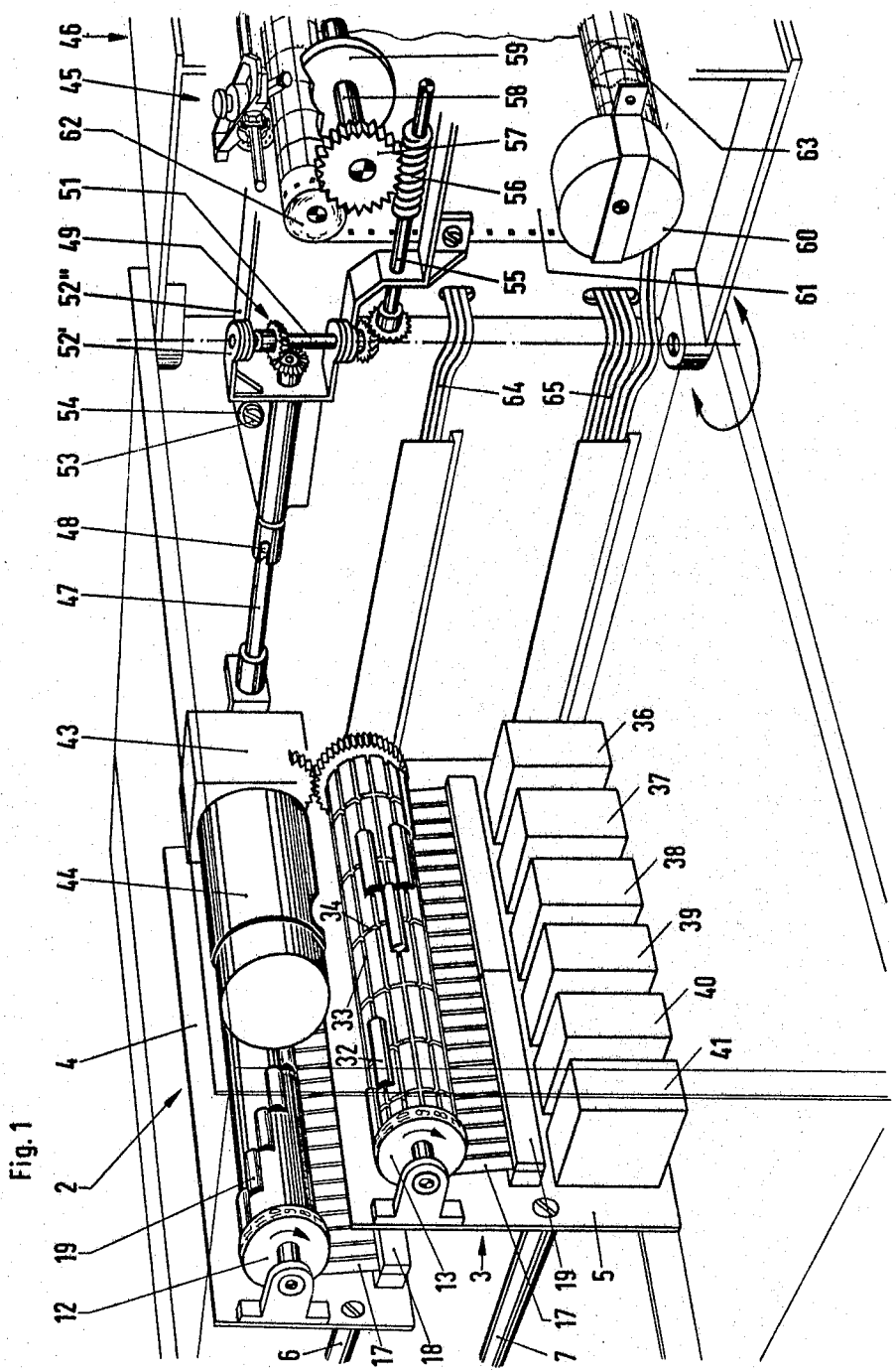
FIG. 1 shows the recorder with a registering portion swung to outer position.
Figure 2:
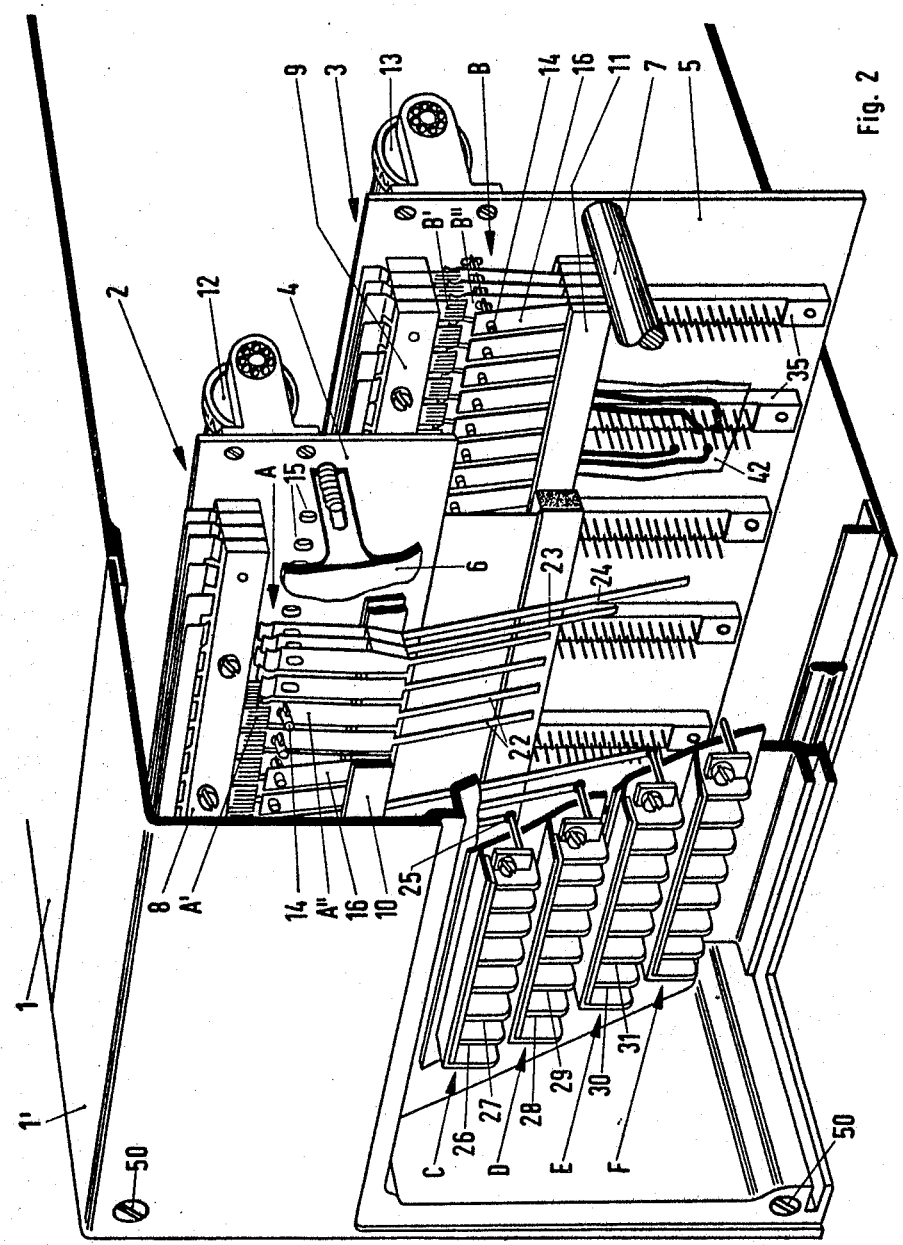
FIG. 2 is a perspective of a fragmental view of the rear of the recorder.

As shown in FIGS. 1 and 2 the invention includes a housing 1 having a rear removable part 1' on which a station selector switch 2 and measuring range selector switch 3 are mounted with the aid of carrier plates 4 and 5 and pairs of distance pieces 6 and 7. The two types of switches are provided with contact spring blade assemblies A and B respectively disposed vertically alongside each other, each contact spring assembly being made up of three contact blade pairs lying one behind the other and each including a fixed spring or blade A' and B' respectively and a cooperating movable contact blade A" or B" as the case may be. Multi-part insulating cleats 8, 9, 10, and 11 screwed onto the carrier plates 3 and 4 hold the blades in a well known manner.

The opening and closing of the blade assemblies follows from the action of rotary roll cams 12 and 13, on the other side of the carrier plates, through the medium of push pins 14 which mechanically couple the movable blades of a blade assembly with one another. The pins 14 pass through apertures 15 in the carrier plates and are driven at the front of and at the rear of the several assemblies by blades such as 16 and 17, which in turn are secured in the insulator blocks 10 and 11 or blades 18 and 19 on the other side of the plates.

Figure 3:
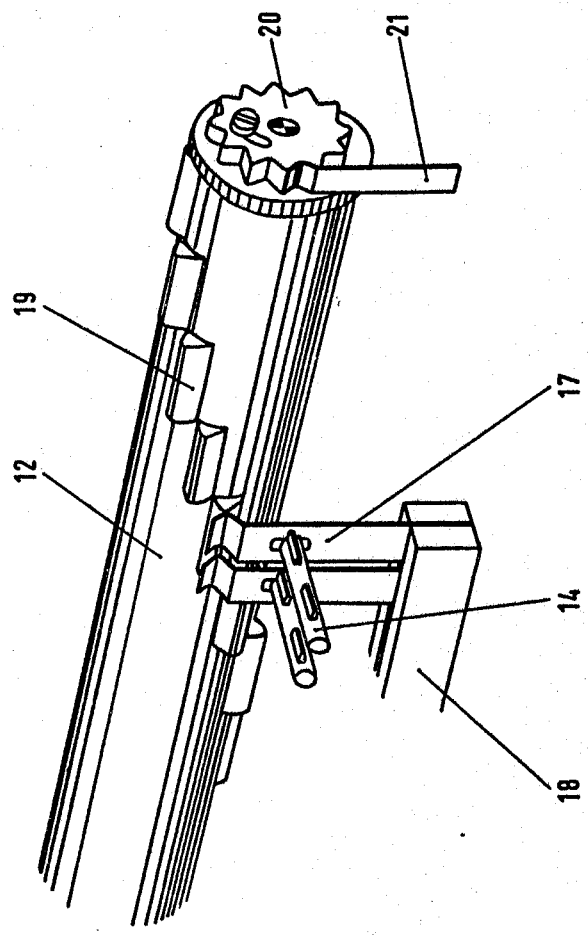
FIG. 3 shows a detail of the station selector switch.

FIG. 3 shows in detail the roll cam 12 of the station selector switch and the two push pins 14 with the guide or driver springs 17. These guide blade springs are pushed and moved by cam lugs 19, and, through the coupling by the pins, to make electrical contacts within the assemblies. A star wheel 20 fixed on the shaft of the cam roll serves in combination with the spring 21 for detaining the roll at given positions.

The station selector roll cam carries about its periphery twelve cam lugs evenly spaced helically. Each lug actuates two adjacent blade assemblies so that during one revolution of the roll all twelve station selector switches are successively operated. The blade assemblies are equidistant from one another as are the exterior connector terminals and the spring assemblies lie at right angles to and above the axes of the terminal screws. The movable blades A" are provided with extensions 22, 23 and 24 whose lengths are respectively sufficient to reach opposite the terminals and provide the connections to the terminals in rows C, D, and E. As shown in FIG. 2 where the row of movable contact blades is designated A" (which row is turned toward the rear wall of the housing) their extensions 22 are connected to the topmost rows C of the exterior terminal connectors. The connection is effected by soldering to the pins 25 of the exterior terminal connectors. In similar manner the two other rows of movable blades A" are connected by their extensions 23 and 24 to the rows D and E of the external terminals. The lowermost row F of the external terminals has no connection with the station selector switch. It can for example, with appropriate wiring serve to connect a counter element in the measurement of temperature by comparative elements.

The work of connecting is especially easily done if the rows C and E as in FIG. 2 are arranged stepwise with each row overhanging the one below. It is possible to provide suitable arrangements of all parts to enable relatively untrained personnel to make the connection since it can be done without much skill.

From the combination thus far described it is seen that for each station where a measurement is taken, six exterior connectors are avalaible for use. For instance, sensing station No. 1 may be connected to terminals 26 to 31. If station No. 1 concerns a direct current voltage measuring, then the terminals 26 and 27 of row C may be connected to a source of DC voltage. For measurements necessitating a connection of three or four leads, for example resistance measurement, terminals 28 and 29 are additionally provided. Leads carrying signals can be connected to terminals 30 and 31 which signals may denote the exceeding or falling below of an intended limit of the measured value.

The switching sequence and the connecting to the sensing station is especially easily recognized in FIG. 1 wherein the direction of rotation of the cam roll 12 is shown and each lug on the back side corresponds to a number which signifies the sensing station switched in by the action of the corresponding lug on the switch of the sensing circuit.

The construction of the measuring range switch 3 essentially corresponds with that for the selector switch with the exception that each lug 32 is slidable or displaceable in a longitudinal groove 33 of the cam roll 13 and shiftable into six different predetermined or locked positions always corresponding to four adjacent blade assemblies and they are operable with twelve pairs of blade assemblies.

Means for holding the lugs against longitudinal movement on the roll 13 is preferably made up of an interrupted ball notch device (not shown) in the cam lug 32 upon which the roll engages the ball by means of spring acting in one of six circumferential grooves 34 in the roll. By using adequate pressure the detention can be overcome and the lug be pushed into another detaining position. Directly below the blade assemblies are six terminal boards 35 arranged parallel thereto leading into units shown as boxes 36, 37, 38, 39, 40 and 41 accommodating printed circuit plates and measuring range wiring or circuits. The connection of the range wiring with the blade assemblies of the range switch is accomplished by printed conductors on sheet 42 having wire connection, which sheets have their connection points plugged in eyes of the movable blades and on the solder pin of the line connector and have the connections soldered.

Considering the measure range circuits in the boxes 36 to 41 as being for measuring ranges Nos. 1 to 6 and for example No. 1 range to be switched into the circuit of a sensing element at a particular station, then the corresponding cam lug in groove No. 1 (designated the station number on the rear side of the cam roll of the measuring roll selector switch) is brought into its outermost right detained position. If the lug is at the second position from the right the measuring range No. 2 is switched into the measuring circuit of this station, and so on. If all lugs are in the same detained position it follows then that all stations have the same scale range.

The drive for the cam rolls of both switch banks is by means of a synchronous motor 44 through a switching gear 43, and both rolls turn in the same direction. The cam rolls revolve synchronously and in such a manner that the associated lugs of the two switches (as is necessary) switch the corresponding blade contacts substantially simultaneously. It is evident that the development of the measuring range switch as a cam switch having blade assemblies lying near one another longitudinally adjacent of the adjustable lugs of the rolls enables an especially simple adjustability of range of the device for the several sensing stations.

Between the switch gear 43 for the motor 44 and the changeover device for the point printer 45 in part 46 of the housing which swings out and contains the recording elements, there is a reliable drive coupling for the synchronous running of the station selector switch and the changeover device for the striking stylus.

This coupling comprises a shaft 47 with detachable coupling 48 and axially perpendicular miter wheel gearing 49. The detachable coupling is interposed to enable removal of the rear portion 1' of the housing together with the sensing circuit wiring as the drive motor 44, both fixed on the portion 1'. The removal can take place by the loosening of a screw 50 in the housing rear wall. The mitered gearing forms a movable connection joint in the drive combination between the station selector switches in the housing and the changeover device in the outwardly swingable front portion for the point marker of the recorder.

The mitered gearing includes a vertical shaft 51 which coincides with the hinging axis of the front registering part, the shaft being bearingly mounted in parts 52' and 52" as hinge teeth. The part 52' is fixed in the housing by a screw 53 and spring washer 54 so that there is almost no play. The turnable hinge half 52" is secured fast on the registered portion. The minute amount of play of the hinge half 52' prevents binding of the miter gearing when the registering front portion 46 is swung in and out. A worm 56 on a horizontal shaft 55 of the mitered transmission gearing in the swingable part of the housing engages on a toothed wheel 57 therein for reducing the speed to a value suitable for the changeover of the point printer. Only the shaft 58 and multiplex step wheel 59, for releasing the printing motion of the printer are shown. A synchronous motor 60 provides feed for a chart paper 61 taken off a supply roll 62. The chart strip passes under the printer and is wound upon the take-up roll 63.

The shaft 47 may be stepped up considerably in speed from that of the cam rolls, not only to have the cam 59 turn sufficiently for any station selected but so that, with the worm and gear reduction, a swinging of the outer part of the housing will not cause undesirably extensive movement of the cam 59, assuming the shaft take-off to be stationary.

As is shown in FIG. 1 the present construction of the transmission connection enables the number of electrical leads from the rear stationary part of the housing to the swingable portion to be reduced to nine. The three-wire cable 64 is connected to the potentiometer of the balancing device and the six-wire cable serves for the voltage supply of the motor powered drives on the registering front part.

The arrangement and construction of the station selector switch provides an independently important aspect in the favorable cabling to the outer terminal connectors and the convenient line-up of the arrangement of the measuring range devices in recorders that do not have the front portion containing the stylus outwardly swingable. In such a case in order to make the several elements of the instrument easily accessible they are built on a frame withdrawable from the housing and with the terminal connectors on the back side which project rearwardly through a cutout in the housing.

Figure 4:
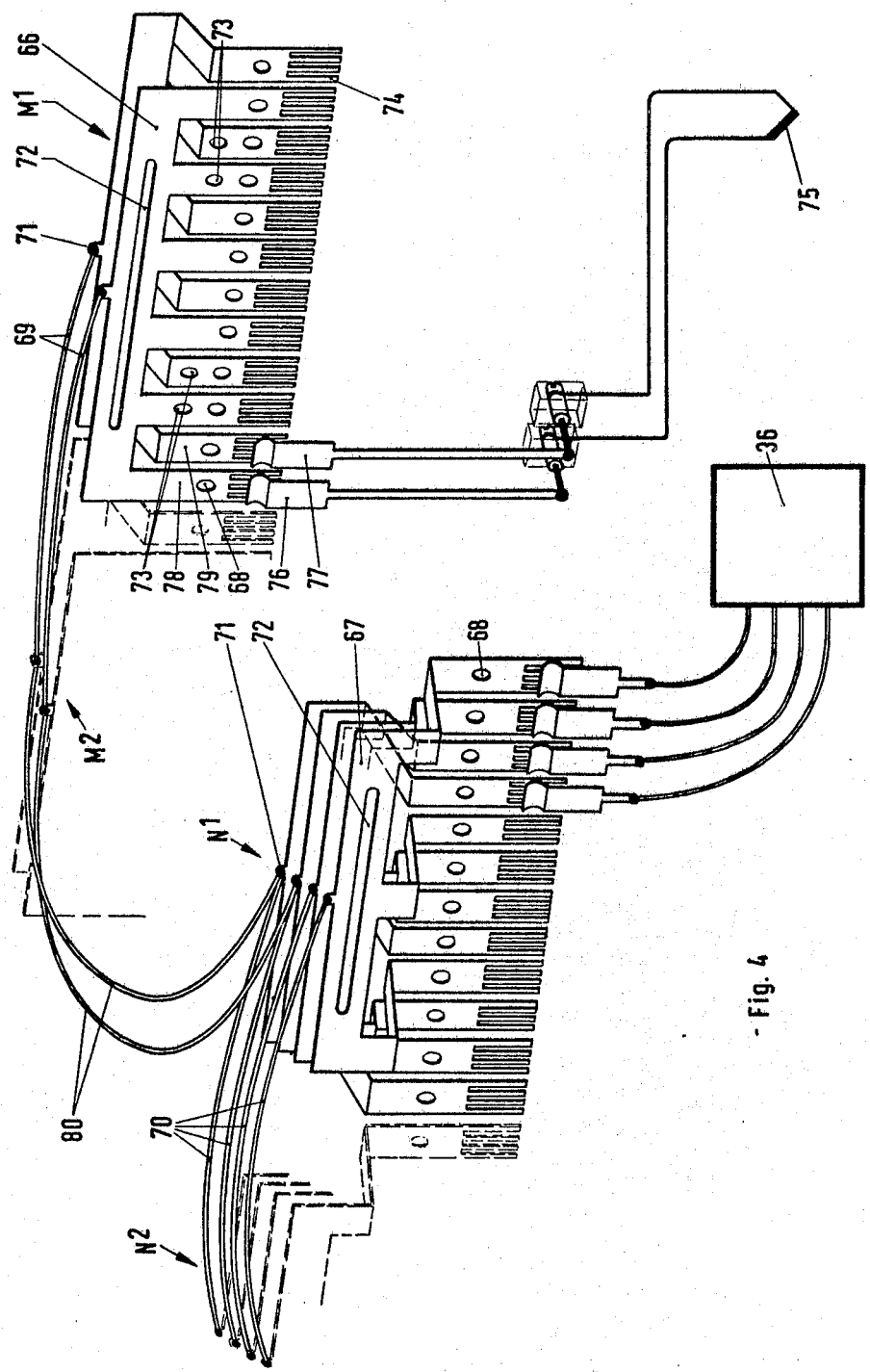
FIG. 4 shows details of contact blade assemblies of the station selector switch and the measuring range switch and FIG. 5 shows the circuitry of the recorder.

FIG. 4 show details for arrangement and construction of the fixed contact blades of the measuring range switch which are connected to the range circuitry 36 and the upper part of FIG. 4 shows the blade row of the station selector switch and thereunder of the measuring range switch. The second and third rows parallel thereto are not shown but they are formed in the same way for each switch. For the station selector switch there are always six contact blades united together forming a comb shaped composite blade spring 66. The blade series is made up of four of the resulting blades whereby always two blade springs have interfitting fingers such as 78 and 79 so that the fingers lie in a plane, and, for example, form one half $M^1$ of the contact blade row. The other half $M^2$ is only suggested by botted lines since it is formed in exactly the same way. The division into two halves is of practical value and enables cutting costs. The station selector switch can therefore be formed for two spaced switch portions one in front of the other, and by the removal of a switch-half the multiplex dotted line recorder, may be changed over with correspondingly minimum technical skill to one with half the number of sensing stations or ranges.

In the case of the range changing switch, it can also be formed from two like halves $N^1$ and $N^2$ each having fixed blades in the shown row of contactors and composed of four blades 67 having three appropriately offset fingers. Together the halves provide twenty-four fixed single contact blades all lying side by side in a single plane.

For the mechanical adjustment and to insure that the insulation of the cleats or blocks 8 and 9 (FIG. 2) mounted on the carrier plates 4 and 5 is effective, the comb backs of the blade springs are, as shown, decidedly offset and the blades are all provided with registering apertures 68 for adjusting pins and fastening elements. The electrical connection of the proper comb-shaped blade springs is accomplished by means of lead wires 69 and 70 soldered onto ears 71 of the comb backs. It is evident that the employing of the comb-shaped blade spring enables a reduction in wiring which otherwise would necessitate connections to each contact blade.

The cutouts 72 and 73 in the backs of the comb-shaped spring composite blade series equalize the resistance between the several contact positions and the soldered connection at the ear. This feature has special significance when the voltages to be measured are quite low. In such a case it is necessary, for highest degree of sensitivity, that as nearly as possible matching resistance values be present in switched circuits of the sensing stations including the instrument itself. By means of such cutouts it is possible to obtain this matching of values and considerably reduce wiring in the instrument, as has been found.

In the contact zone the fixed contact springs are slitted to provide tine-like end portions 74 with the tines flexible independently of each other. With this construction the resistance at the contacts due to fouling is kept low and for the same reason the tines are vertical so that any small particle of dust can fall off.

In FIG. 4 the thermocouple element 75 is shown as an example of a sensor at a station and its lead wires are connected to a pair of movable blade spring contacts 76 and 77. The element is associated with a station identified as No. 6 since it is connected to the sixth pair of terminals in row C of the exterior connector terminals, the order of numbering being from right to left in conformity with the numbering in FIG. 1. Movable contacts 76 and 77 directly connected to the thermocouple engage with the prongs 78 and 79 and the respective comb-shaped springs. By means of leads 80 the two comb-like elements having the respective contacts 78 and 79 are connected to the contact-spring row of the measuring range switch. From the indicated contacting of the movable contacts of the rows it is evident that the temperature element is associated with measuring range No. 1, and, according to FIG. 1, the four contact pairs on the end of the row from left to right, are operated by the adjacent lug for connecting up the No. 1 measuring range wiring in box 36 for the station No. 6. The complete wiring scheme is set forth clearly in FIG. 5 wherein at the right side all blade assemblies of the station selector switch from stations 5 and 6 are shown with their associated exterior connector terminals, as operated by cam action.

Figure 5:
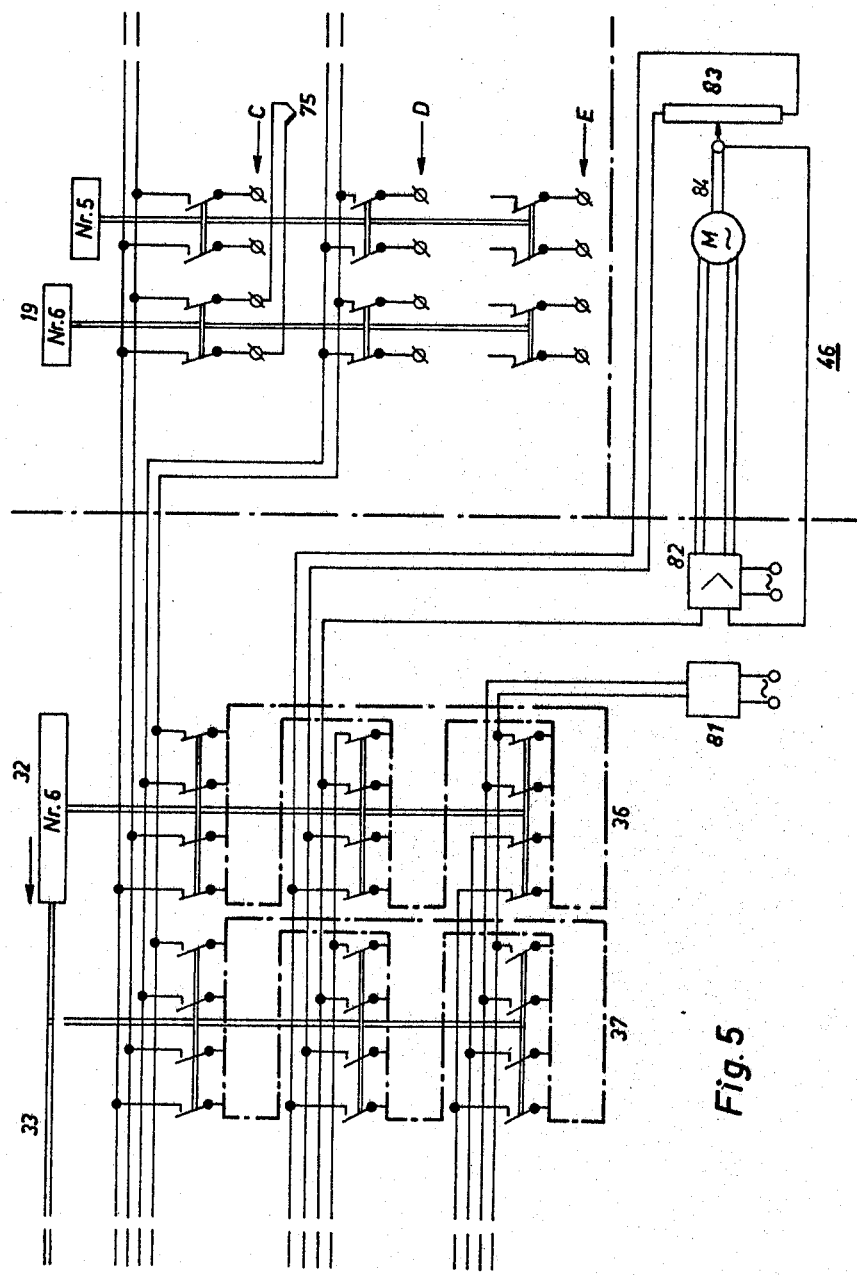

The left half of FIG. 5 indicates blade assemblies of the measuring range change switch connected to the boxes 36 and 37 in which there are measuring range circuitries for range Nos. 1 and 2. The cam lugs associated with the sensing station No. 6 of the station selector switch and the range selector switch simultaneously close the associated contact assemblies of both switches. Thereby the No. 6 station with the thermo-element 75 as well as the range circuit No. 1 are connected to the balancing means of the marker and the marker registers the output of the thermo-element.

In similar manner the remaining four range and ten switching stations are connected to the leads of the blade assemblies of the station selector switch and of the range switch. The connections to the constant voltage supply 81, to the amplifier 82, and to the measuring poentiometer 83 in the registration portion 46 are controlled by the blade assemblies of the range changing switch. It is obvious that only three measuring circuit conductors from the housing to the potentiometer in the registration part are required just as only four conductors for the feed of servomotor 84. Several contact blade pairs on the range changing switch are free and may be used for special take-off for other use, say, for switching in of filtering means such as condensers or means for varying the output of the amplifier.

The units contain resistors which effect different measuring ranges used for the sensing stations and shift the smallest and greatest measuring value of each measuring range to the end portions of the potentiometer winding, and, consequently the stylus mechanically coupled to the tap is shifted on full scale deflection for the greatest value. The trip or pressure wheel 59 for the stylus may be slidable on its shaft 59 and follow the stylus means transverse to the chart strip in known manner. Substantially constantly running means powered by the shaft 55 in the registration portion 46 can be used to sequentially change differently colored ink rolls or change and print a station identifying character on a printing wheel according to the number of times the stylus has been tripped so as to identify the dotted curve. These features are not part of the invention.

In operation the two cam rolls 12 and 13 are run synchronously with the staggered lugs actuating a station set of contacts and simultaneously its appropriate range contacts so that the servomotor 84 balances the potentiometer 83. The stylus or printing head 45 moves with the slide tap of the potentiometer and traverses the chart strip, and finally the stylus is tripped. Obviously the tripping must be timed to occur after the potentiometer is substantially balanced for each station and its range. Neither can the stylus be moved to another range until after the tripping. The use of a lost motion drive for the cam rolls and the star wheel 20 and detent spring 21 insure that the cam lugs remain operative with their respective blade assemblies a sufficient length of time for the stylus to strike properly.

It is to be understood that the preferred embodiment shown is only an example of the invention. For instance, while the mitered gearing is a very satisfactory means for driving the printer, other means known or obvious in the art enabling the swinging out of the registration portion may be used.

What is claimed is:

1. A point-by-point multiplex recorder for indicating electrical values measured at a plurality of sensing stations comprising a housing having joined first and second mating parts, the first part being adapted to be substantially fixed and the second being outwardly swingable from the first about a substantially fixed axis; registration means mounted in the second part, said registration means including means for advancing a chart strip at a predetermined rate and a depressible marking pointer having rotary depressing cam means for intermittently marking points on the strip; rotary electromechanical station selector switch means mounted in the first part of the housing and having a rotary shaft take-off; and slightly yieldably mounted mechanical transmission gearing means between said take-off and rotary cam means for permitting relative swinging of the two housing parts and for transmitting rotary motion between the shaft take-off and the cam means at a substantially constant speed ratio.

2. A recorder as claimed in claim 1, said gearing means including a rotary shaft substantially axially alined with said fixed axis and geared to run with the take-off.

3. A recorder as claimed in claim 1 and motor means for rotating the switch means and within the first part of the housing.

4. A recorder as claimed in claim 1, said station selector switch means comprising a plurality of contact blade assemblies, wherein blades of several adjacent assemblies are formed in comb-shape having blades integral with the back of the comb and said back being shaped to equalize the electrical resistance from a point thereon to the several blades.

5. In a point-by-point recording instrument for recording from a plurality of sensing stations, a mount and housing; a substantially fixed plurality of spring contact blade assemblies within the housing and on the mount, the assemblies being disposed alongside and near each other respectively, as elements of a station selector switch, the blades of the assemblies having substantially fixed position connector extension portions, and fixed connector terminal lugs, at least one of which are for connections from the stations and arranged opposite the connector extension portions of the blades, the arrangement being such that each extension portion is paired respectively with a corresponding connector lug successively in a stepwise manner in one of two directions in space for providing locations for conductor pieces between the lugs and the extension portions without the pieces crossing each other in space.

6. In an instrument as claimed in claim 5, the assemblies having at least three connector extensions each and of different lengths and the assemblies being at least six in number.

7. In an instrument as claimed in claim 5 and straight connector pins all of equal length in said locations connecting the respective lugs and extensions.

8. In a recorder as claimed in claim 6 each of the blade extensions in each blade assembly being of a different length and extending in the same direction, and the lugs associated with such an assembly being situated in space in a series in said same direction, and said plurality of assemblies being disposed in a row alongside each other, the row being transverse to said same direction, and essentially in a plane approximately perpendicular to the straight conductors, and the lugs being essentially open to the exterior of the housing.

9. A point-by-point multiplex recorder for indicating electrical values measured at a plurality of sensing stations comprising chart feeding means and printing means therefor; an electro-mechanical station selector switch for selectively obtaining signal current from the respective stations for the printing means; range changing means between printing means and the station selector switch for moving the printing means relative to the chart feeding means in order that the printing means may operate on a chart fed by the feeding means in generally predetermined zones on the chart, said range changing means including a plurality of contact blade assemblies for operating different resistor circuits with a rotary roller near the assemblies, the roller being provided with circumferentially spaced adjustably positioned cam lugs for operating the respective assemblies whereby for each position of the lugs the desired assembly corresponding to a desired measuring range will be operated.

10. A recorder as claimed in claim 9, said cam lugs being slidable in the direction of the axis of the roller and from near one assembly to another, and spring detaining means for holding the lugs in selected position.

11. A recorder as claimed in claim 9, said station selector switch including contact blade assemblies parallel to those of the range changing means and having an adjacent roller provided with a cam lug adjacent each selector switch assembly for actuating the latter.

12. A recorder as claimed in claim 1, said selector switch means including a plurality of side-by-side contact blade assemblies, and a rotary roller transverse and adjacent thereto and provided with longitudinally and circumferentially spaced cam lugs for actuating the assemblies.

References Cited
UNITED STATES PATENTS

| | | | |
|---|---|---|---|
| 2,113,748 | 4/1938 | Ross et al. | 346—44 |
| 3,295,140 | 12/1966 | Parker et al. | 346—34 |

JOSEPH W. HARTARY, Primary Examiner.

U.S. Cl. X.R.

346—65, 145